(12) United States Patent
Yang et al.

(10) Patent No.: US 7,885,084 B2
(45) Date of Patent: *Feb. 8, 2011

(54) CONTROL CIRCUIT FOR SYNCHRONOUS RECTIFYING AND SOFT SWITCHING OF POWER CONVERTERS

(75) Inventors: Ta-yung Yang, Milpitas, CA (US);
Pei-Sheng Tsu, Taipei County (TW);
Chou-Sheng Wang, Keelung (TW)

(73) Assignee: System General Corp., Taipei Hsien (TW)

( * ) Notice: Subject to any disclaimer, the term of this patent is extended or adjusted under 35 U.S.C. 154(b) by 591 days.

This patent is subject to a terminal disclaimer.

(21) Appl. No.: 11/866,778

(22) Filed: Oct. 3, 2007

(65) Prior Publication Data

US 2009/0091951 A1 Apr. 9, 2009

(51) Int. Cl.
*H02M 3/335* (2006.01)
(52) U.S. Cl. ............. 363/21.01; 363/21.03; 363/21.06; 363/21.14
(58) Field of Classification Search ............... 363/21.02, 363/21.03, 21.06, 21.14, 95, 131, 21.01, 363/97
See application file for complete search history.

(56) References Cited

U.S. PATENT DOCUMENTS

| | | | | |
|---|---|---|---|---|
| 5,986,895 A * | 11/1999 | Stewart et al. | ................. | 363/16 |
| 6,839,246 B1 * | 1/2005 | Zhang et al. | ............. | 363/21.06 |
| 7,173,835 B1 | 2/2007 | Yang | | |
| 7,385,832 B2 * | 6/2008 | Allinder | ................. | 363/21.14 |
| 7,408,796 B2 * | 8/2008 | Soldano | ...................... | 363/127 |
| 7,558,082 B2 * | 7/2009 | Jitaru | ...................... | 363/21.06 |
| 7,616,457 B2 * | 11/2009 | Yang | ........................ | 363/21.06 |
| 2006/0072349 A1 * | 4/2006 | Lin | ......................... | 363/21.06 |
| 2008/0049456 A1 * | 2/2008 | Moromizato et al. | ...... | 363/21.06 |
| 2008/0310203 A1 * | 12/2008 | Yang et al. | .................. | 363/126 |
| 2009/0027926 A1 * | 1/2009 | Yang et al. | ............... | 363/21.14 |
| 2009/0040792 A1 * | 2/2009 | Yang et al. | ............... | 363/21.06 |
| 2009/0110129 A1 * | 4/2009 | Yang et al. | .................. | 375/354 |

FOREIGN PATENT DOCUMENTS

| | | |
|---|---|---|
| CN | 2554861 | 6/2003 |
| JP | 2001-069756 | 3/2001 |
| JP | 2005-020970 | 1/2005 |

* cited by examiner

*Primary Examiner*—Jeffrey L Sterrett
*Assistant Examiner*—Fred E Finch, III
(74) *Attorney, Agent, or Firm*—J.C. Patents

(57) ABSTRACT

A control circuit for soft switching and synchronous rectifying is provided for power converter. A switching-signal circuit is used for generating drive signals and a pulse signal in response to a leading edge and a trailing edge of a switching signal. The switching signal is developed for regulating the power converter. Drive signals are coupled to switch the power transformer. A propagation delay is developed between drive signals to achieve soft switching of the power converter. An isolation device is coupled to transfer the pulse signal from a primary side of a power transformer to a secondary side of the power transformer. A controller of the integrated synchronous rectifier is coupled to the secondary side of the power transformer for the rectifying operation. The controller is operated to receive the pulse signal for switching on/off the power transistor. The pulse signal is to set or reset a latch circuit of the controller for controlling the power transistor.

28 Claims, 6 Drawing Sheets

CONTROL CIRCUIT FOR SYNCHRONOUS RECTIFYING AND SOFT SWITCHING OF POWER CONVERTERS

BACKGROUND OF THE INVENTION

1. Field of the Invention

The present invention relates in general to a control circuit of power converter, and more particularly, to a control circuit for synchronous rectifying and/or soft switching of power converters.

2. Description of Related Art

FIG. 1 shows a circuit schematic of a soft switching power converter, such as a resonant power converter, which includes a power transformer 10 to provide isolation from AC line input to the output of the power converter for safety. The soft switching of the power converter achieves high efficiency and low EMI (electric-magnetic interference) performance. Transistors 20 and 30 develop a half bridge circuit to switch a resonant tank. The resonant tank is formed by the power transformer 10, an inductor 15 and a capacitor 40. The inductor 15 acts as a primary-side leakage inductance of the power transformer 10 and/or an inductance device. The inductance L of the inductor 15 and the capacitance C of the capacitor 40 determine the resonance frequency $f_0$.

$$f_0 = \frac{1}{2\pi\sqrt{L \times C}} \quad (1)$$

The power transformer 10 transfers the energy from the primary side to the secondary side of the power transformer 10. Rectifiers 41 and 42 rectify the switching voltage of the power transformer 10 into a capacitor 65. A DC voltage $V_O$ is thus outputted at the output terminal of the power converter.

In recent development, applying the synchronous rectifier on the secondary side of the power transformer is a further approach to achieve a higher efficiency power conversion, such as "Control circuit associated with saturable inductor operated as synchronous rectifier forward power converter" by Yang, U.S. Pat. No. 7,173,835. However, the disadvantage of this prior art is an additional power consumptions caused by saturable inductors, etc.

SUMMARY OF THE INVENTION

The present invention provides a control circuit for soft switching and synchronous rectifying of power converters to achieve higher efficiency.

A control circuit for soft switching and synchronous rectifying is provided to improve the efficiency of the power converter. The control circuit includes a switching-signal circuit for generating drive signals and a pulse signal in response to the rising edge and the falling edge of a switching signal. The switching signal is utilized to regulate the power converter. Drive signals are coupled to switch the power transformer. A propagation delay is developed between drive signals for achieving the soft switching of the power converter. An isolation device, such as a pulse transformer or capacitors, is coupled to the switching-signal circuit to transfer the pulse signal from the primary side of the power transformer to the secondary side of the power transformer.

An integrated synchronous rectifier comprises a cathode terminal, an anode terminal, a first input-signal terminal and a second input-signal terminal. The cathode terminal is coupled to the secondary side of a power transformer. The anode terminal coupled to the output of the power converter. A power transistor is connected between the cathode terminal and the anode terminal. The first input-signal terminal and the second input-signal terminal are coupled to a controller to receive the pulse signal. The pulse signal is coupled to set or reset a latch circuit of the controller for turning on/off the power transistor. The pulse signal is a trig signal. The pulse width of the pulse signal is shorter than the pulse width of the switching signal.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DETAILED DESCRIPTION OF EMBODIMENTS

Figure 1:
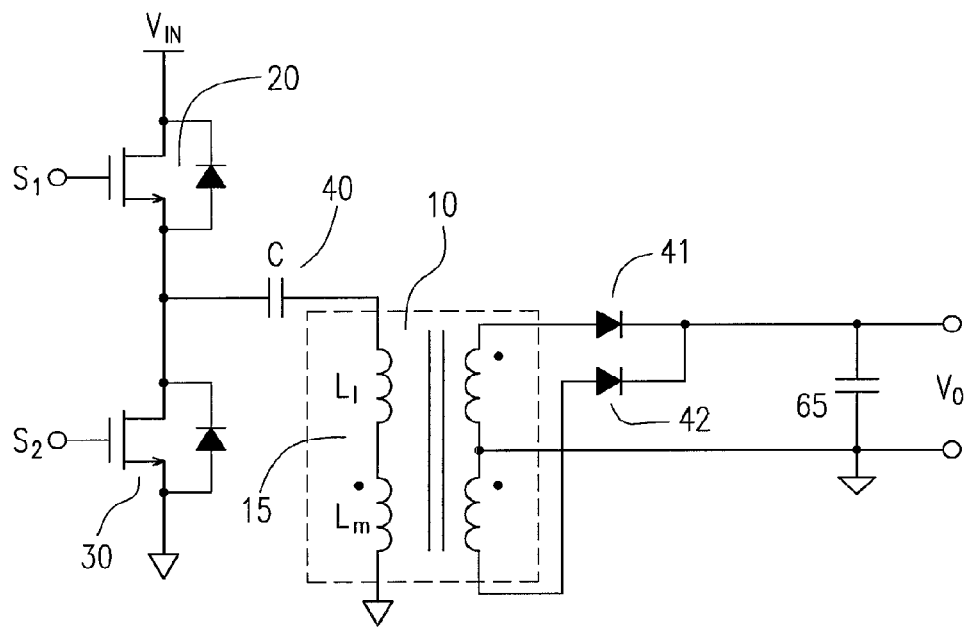
FIG. 1 shows a circuit schematic of a resonant power converter.
Figure 2:
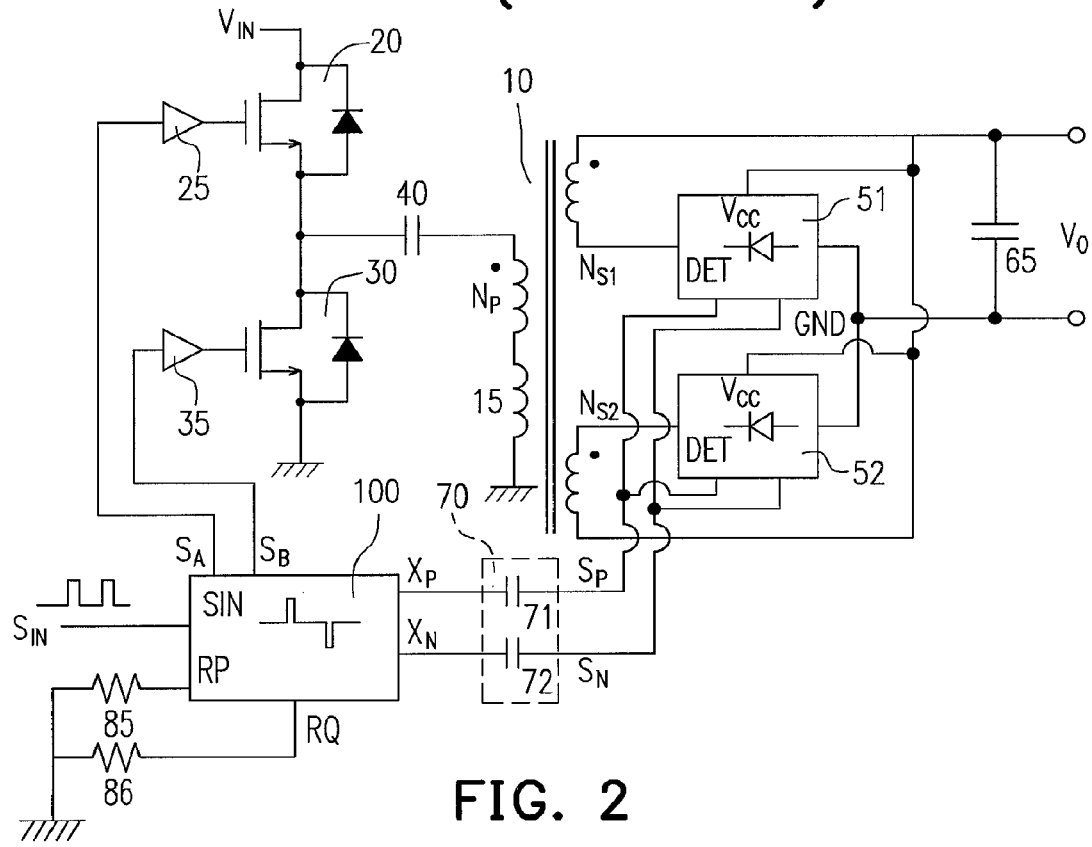
FIG. 2 shows an embodiment of a soft switching power converter with integrated synchronous rectifier according to the present invention.

FIG. 2 shows a soft switching power converter with integrated synchronous rectifier (synchronous rectifying circuit) of an embodiment of the invention. The power converter includes a power transformer 10 having a primary side and a secondary side. The primary side of the power transformer 10 comprises two power switches 20 and 30 for switching the primary winding $N_P$ of the power transformer 10. The secondary side of the power transformer 10 includes a secondary winding $N_{S1}$ and another secondary winding $N_{S2}$. A first integrated synchronous rectifier 51 comprises a cathode terminal DET connected to the secondary winding $N_{S1}$. An anode terminal GND of the first integrated synchronous rectifier 51 is connected to the ground of the power converter. A second integrated synchronous rectifier 52 having the cathode terminal DET and the anode terminal GND is also connected from the secondary winding $N_{S2}$ to the ground of the power converter. A first input-signal terminal $S_P$, a second input-signal terminal $S_N$ of the first integrated synchronous rectifier 51 and the second integrated synchronous rectifier 52 are connected to the secondary side of an isolation device 70 to receive a pulse signal for turning on or turning off the integrated synchronous rectifiers 51 and 52. The isolation device 70 can be composed of capacitors 71 and 72, or can be a pulse transformer. The capacitance of capacitors 71 and 72 can be small, such as 20 pF, but high-voltage rating of capacitors is required for the isolation.

A switching-signal circuit 100 includes an input signal terminal SIN that is coupled to receive a switching signal $S_{IN}$ for generating the pulse signal in response to the rising (leading) edge and the falling (trailing) edge of the switching signal $S_{IN}$. The switching signal $S_{IN}$ is developed to switch the power transformer 10 and regulate the power converter. The pulse signal is produced on a first output-signal terminal $X_P$ and a second output-signal terminal $X_N$ of the switching-signal circuit 100. The pulse signal is a differential signal. The polarity of the pulse signal determines turning on or turning off of the integrated synchronous rectifiers 51 and 52. The switching-signal circuit 100 includes a programming terminal RP coupled to generate a program signal through a resistor 85. When the power converter is operated in burst mode and/or discontinuous current mode at the light load, the switching-signal circuit 100 can thus produce an additional pulse signal to turn off synchronous rectifier 51 and 52 in accordance with the program signal and the pulse width of the switching signal $S_{IN}$. The power converter will stop the switching during the burst period of the burst mode for power saving.

The switching-signal circuit 100 further generates drive signals $S_A$ and $S_B$ in response to the rising (leading) edge and the falling (trailing) edge of the switching signal $S_{IN}$. The drive signals $S_A$ and $S_B$ are coupled to control power switches 20 and 30 through drive circuits 25 and 35 respectively, for switching the transformer 10. A time delay is developed between the enabling of the switching signal $S_{IN}$ and the enabling of the drive signals $S_A$ and $S_B$. Besides, a propagation delay $T_D$ is developed between drive signals for achieving the soft switching of the power converter. Furthermore, a second programming terminal RQ of the switching-signal circuit 100 is coupled to produce a timing signal through a resistor 86. The timing signal is coupled to a minimum-on time circuit (MIT), which is introduced later, to ensure a minimum on time of the drive signal $S_A$. The minimum on time of the drive signal $S_A$ will generate a minimum circulate current at the inductor 15 to achieve the soft switching of the power converter.

The first output-signal terminal $X_P$ and the second output-signal terminal $X_N$ of the switching-signal circuit 100 are coupled to the isolation device 70 to transfer the pulse signal from the primary side of the power transformer 10 to the secondary side of the power transformer 10. The pulse width of the pulse signal is shorter than the pulse width of the switching signal $S_{IN}$. The pulse signal is a trig signal that includes high frequency elements. Therefore, only small capacitors or a small pulse transformer is required for the isolation device 70, which reduces the space utilization on the PCB and reduce the cost of the power converter.

Figure 3:
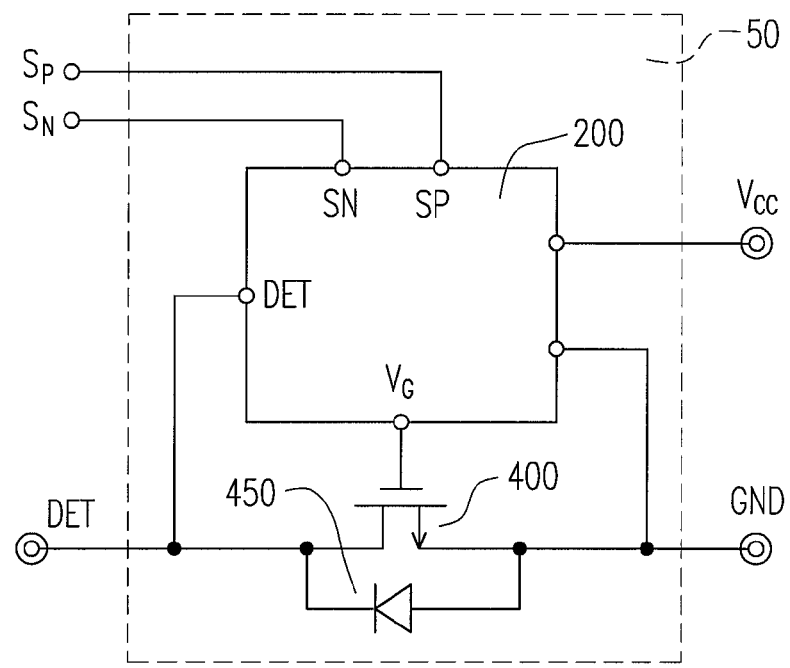
FIG. 3 is a schematic diagram of an integrated synchronous rectifier according to an embodiment of the present invention.

FIG. 3 is a schematic diagram of an embodiment of an integrated synchronous rectifier (synchronous rectifying circuit) 50, which represents the circuit of integrated synchronous rectifiers 51 or 52. The integrated synchronous rectifier 50 includes a power transistor 400, a diode 450 and a controller 200. The diode 450 is connected in parallel to the power transistor 400. The power transistor 400 is connected between the cathode terminal DET and the anode terminal GND. The cathode terminal DET is coupled to the secondary side of the power transformer 10. The anode terminal GND is normally coupled to the output of the power converter. The controller 200 is coupled to receive the pulse signal via the first input-signal terminal $S_P$ and the second input-signal terminal $S_N$ for turning on or turning off the power transistor 400. A $V_{CC}$ terminal is utilized to supply the power source to the controller 200.

Figure 4:
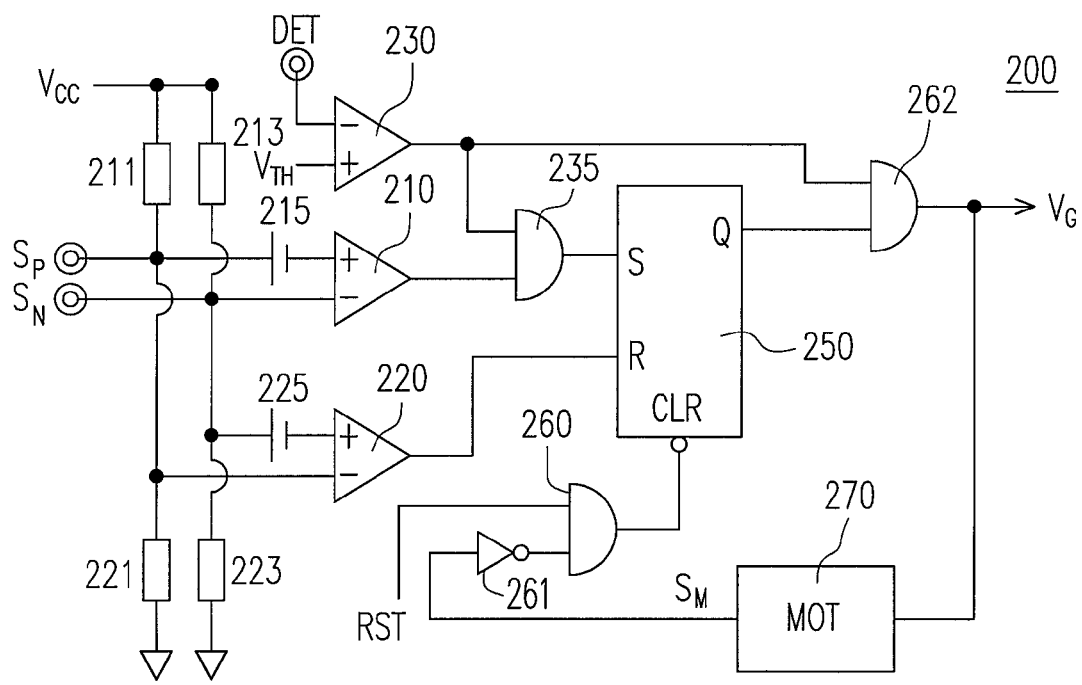
FIG. 4 is an embodiment of a controller of the integrated synchronous rectifier according to the present invention.

FIG. 4 shows a schematic diagram of an embodiment of the controller 200 according to the present invention. Resistors 211 and 221 provide a bias termination for the first input-signal terminal $S_P$. Resistors 213 and 223 provide another bias termination for the second input-signal terminal $S_N$. The first input-signal terminal $S_P$ is coupled to the positive input of a comparator 210 and the negative input of a comparator 220. The second input-signal terminal $S_N$ is coupled to the positive input of a comparator 220 and the negative input of a comparator 210. Comparators 210 and 220 comprise offset voltages 215 and 225 respectively, which produces hysteresis. A third comparator 230 having a threshold $V_{TH}$ connects to its positive input. The negative input of the comparator 230 is coupled to the cathode terminal DET. The outputs of comparators 210 and 230 are coupled to the set-input terminal ("S") of a SR flip-flop 250 through an AND gate 235. The reset-input terminal ("R") of the SR flip-flop 250 is controlled by the output of the comparator 220. The output of the SR flip-flop 250 and the output of the comparator 230 are connected to an AND gate 262. A gate-drive signal $V_G$ is generated at the output of the AND gate 262 for controlling the being turned on or being turned off status of the power transistor 400. The maximum on time of the gate-drive signal $V_G$ is limited by a maximum-on-time circuit (MOT) 270. The gate-drive signal $V_G$ is connected to the maximum-on-time circuit 270. After a blanking time, a maximum-on-time signal $S_M$ will be produced in response to the enabling of the gate-drive signal $V_G$. The maximum-on-time signal $S_M$ is connected to an AND gate 260 via an inverter 261. Another input of the AND gate 260 is connected to a power-on reset signal RST. The output of the AND gate 260 is coupled to the clear terminal ("CLR") of the SR flip-flop 250 to clear (reset) the SR flip-flop 250. The maximum on time of the gate-drive signal $V_G$ is thus limited by the blanking time of the maximum-on-time circuit 270. The gate-drive signal $V_G$ will turn off the power transistor 400 once the pulse signal is generated as, $$V_{SN}-V_{SP}>V_{225} \qquad (2)$$

The gate-drive signal $V_G$ will turn on the power transistor 400 when equations (2) and (3) are met, $$V_{SP}-V_{SN}>V_{215} \qquad (3)$$

$$V_{DET}<V_{TH} \qquad (4)$$

where $V_{SP}$ is the voltage of the first input-signal terminal $S_P$; $V_{SN}$ is the voltage of the second input-signal terminal $S_N$. $V_{DET}$ is the voltage of the cathode terminal DET. $V_{TH}$ is the voltage of the threshold VTH; $V_{215}$ is the value of the offset voltage 215; $V_{225}$ is the value of the offset voltage 225.

The voltage of the cathode terminal DET will be lower than the voltage of the threshold VTH once the diode 450 is conducted. In other words, the power transistor 400 can only be turned on after the diode is turned on.

Figure 5:
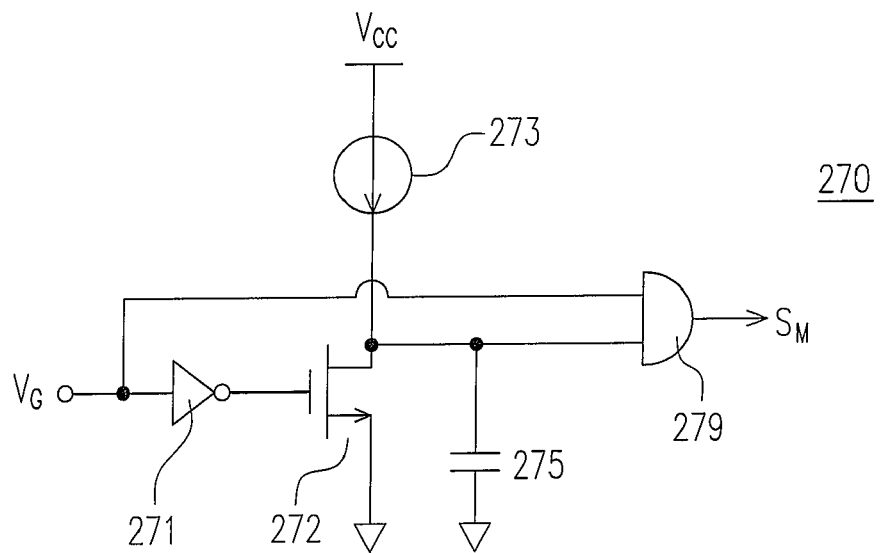
FIG. 5 is a maximum-on-time (MOT) circuit according to an embodiment of the present invention.

FIG. 5 is a schematic diagram of an embodiment of the maximum-on-time circuit (MOT) 270. A current source 273 is connected to charge a capacitor 275. A transistor 272 is connected to discharge the capacitor 275. The gate-drive signal $V_G$ is coupled to control the transistor 272 through an inverter 271. The gate-drive signal $V_G$ is further connected to an AND gate 279. Another input of the AND gate 279 is coupled to the capacitor 275. Once the gate-drive signal $V_G$ is enabled, the output of the AND gate 279 will generate the maximum-on-time signal $S_M$ to disable the gate-drive signal $V_G$ after the blanking time. The blanking time is determined by the current of the current source 273 and the capacitance of the capacitor 275.

Figure 6:
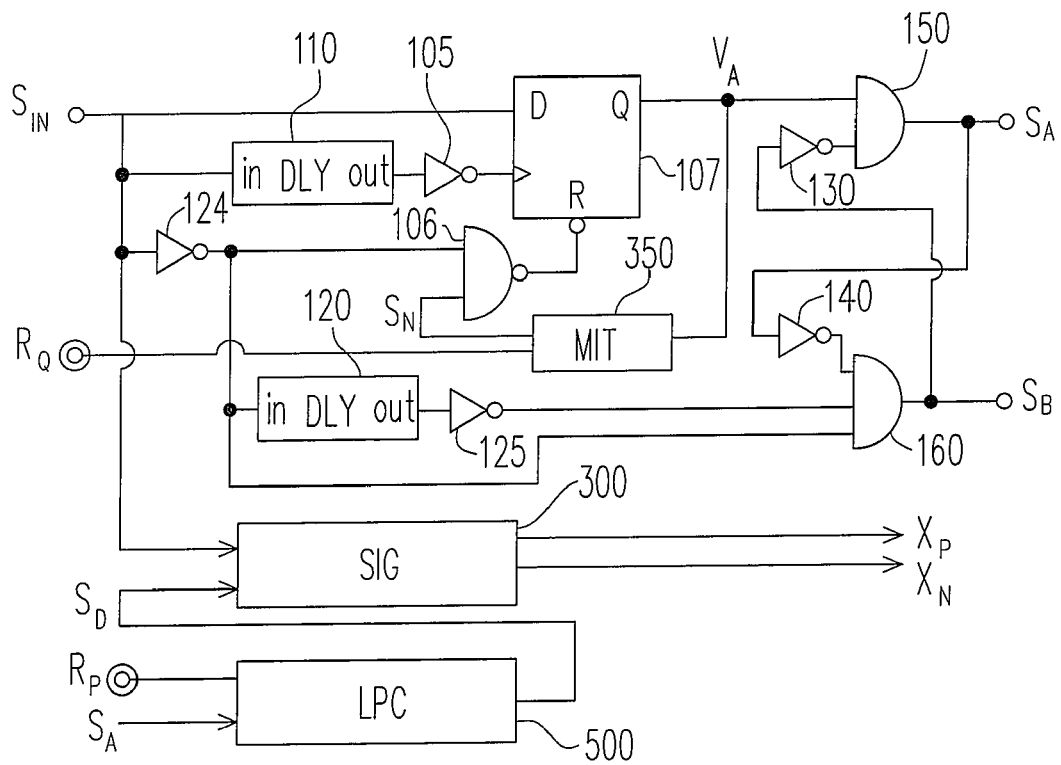
FIG. 6 is a block schematic of a switching-signal circuit according to an embodiment of the present invention.

FIG. 6 is a schematic diagram of an embodiment of the switching-signal circuit 100 according to the present invention. The drive signals $S_A$ and $S_B$ are generated in response to the switching signal $S_{IN}$. The switching signal $S_{IN}$ is connected to the input of a delay circuit 110. The output of the delay circuit 110 is connected to enable a flip-flop 107 through an inverter 105. The D-input of the flip-flop 107 is connected to the switching signal $S_{IN}$. The output of the flip-flop 107 generates a signal $V_A$ connected to the input of an AND gate 150. AND gates 150, 160 and inverters 130 and 140 develop an anti-cross-conduction circuit to generate the drive signals $S_A$ and $S_B$. The output of the AND gate 150 is coupled to the input of anti-cross-conduction circuit. The switching signal $S_{IN}$ is further connected to the input of a delay circuit 120 through an inverter 124. The output of the delay circuit 120 is connected to the input of the AND gate 160 through an inverter 125. Another input of the AND gate 160 is coupled to the output of the inverter 124. The output of the AND gate 160 is coupled to the input of anti-cross-conduction circuit. The output of an NAND gate 106 is connected to reset the flip-flop 107. The output of the inverter 124 is connected to the first input of the NAND gate 106. Another input of the NAND gate 106 is coupled to the output of the minimum-on-time circuit (MIT) 350 to receive a signal $S_N$. The input of the minimum-on-time circuit 350 is coupled to the output of the flip-flop 107 to receive the signal $V_A$. A time delay is developed between the enabling of the switching signal $S_{IN}$ and the enabling of the drive signals $S_A$ and $S_B$. The delay circuits 110 and 120 determine the time delay. The minimum-on-time circuit 350 determines the minimum on time of the drive signal $S_A$. The second programming terminal RQ is coupled to the minimum-on time circuit 350.

The programming terminal RP and the drive signal $S_A$ are coupled to a linear-predict circuit ("LPC") 500. The pulse width of the drive signal $S_A$ is correlated to the pulse width of the switching signal $S_{IN}$. Therefore, the linear-predict circuit 500 will generate a discontinuous-mode signal $S_D$ to turn off the integrated synchronous rectifiers 51 and 52 in accordance with the program signal and the pulse width of the switching signal $S_{IN}$. Both the discontinuous-mode signal $S_D$ and the switching signal $S_{IN}$ are coupled to a signal generation circuit 300 to generate the pulse signal on the first output terminal XP and the second output terminal XN.

Figure 7:
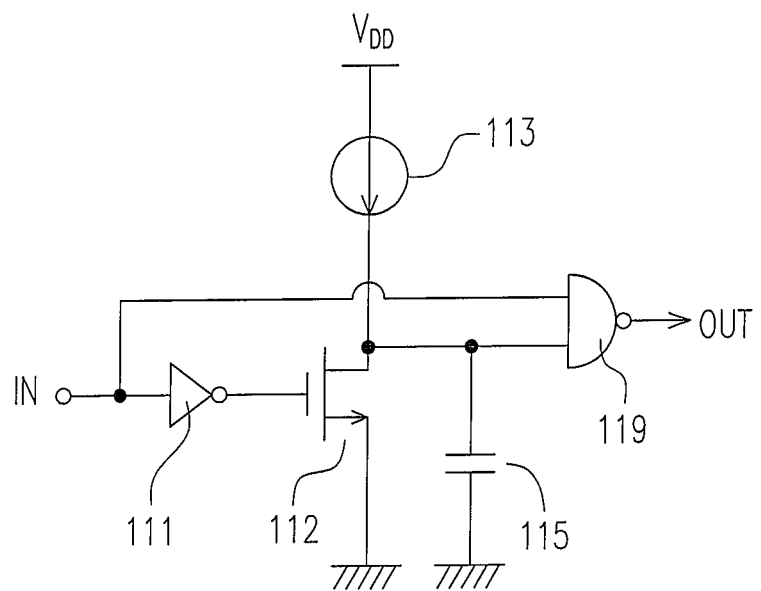
FIG. 7 show a circuit schematic of a delay circuit.

FIG. 7 shows a schematic diagram of an embodiment of the delay circuit. A current source 113 is connected to charge a capacitor 115. A transistor 112 is connected to discharge the capacitor 115. The input signal is coupled to control the transistor 112 through an inverter 111. The input signal is further connected to an NAND gate 119. Another input of the NAND gate 119 is coupled to the capacitor 115. The output of the NAND gate serves as the output of the delay circuit. When the input signal is a logic-low, the capacitor is discharged and the output of the NAND gate 119 is the logic-high. When the input signal is changed to the logic-high, the current source 113 will start to charge the capacitor 115. The NAND gate 119 will output a logic-low once the voltage of the capacitor 115 is higher than the input threshold of the NAND gate 119. The current of the current source 113 and the capacitance of the capacitor 115 determine the delay time of the delay circuit. The delay time is started from the logic-high of the input signal to the logic-low of the output signal of the delay circuit.

Figure 8:
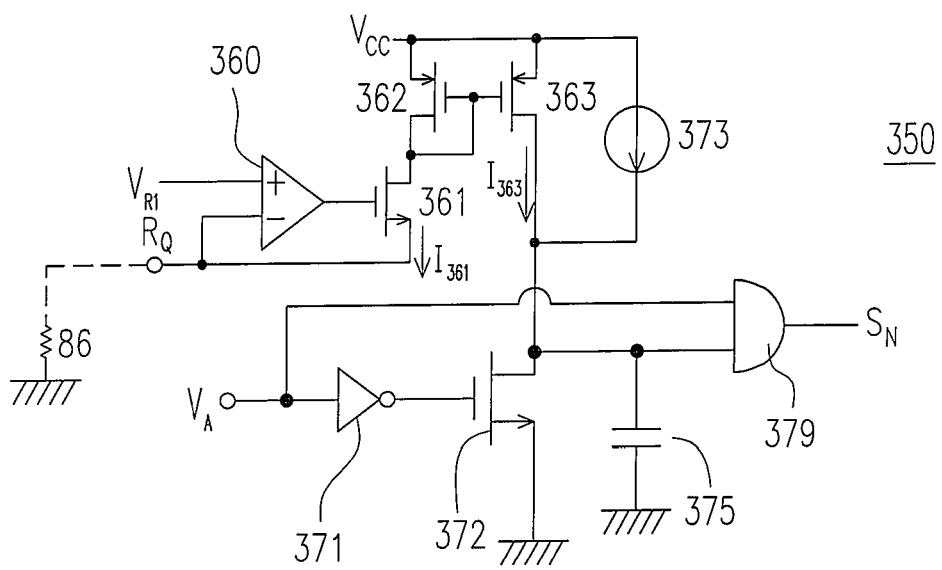
FIG. 8 is a minimum-on-time (MIT) circuit according to an embodiment of the present invention.

FIG. 8 is the minimum-on-time circuit (MIT) 350. An operational amplifier 360 having a negative input is coupled to the second programming terminal RQ. The positive input of the operational amplifier 360 is connected to a reference voltage $V_{R1}$. The operational amplifier 360 associates with the resistor 86 and the transistor 361 and generates a current $I_{361}$ at the transistor 361. Transistors 362 and 363 form a current mirror to generate a current $I_{363}$ at the transistor 363 in response to the current $I_{361}$. A current source 373 and the current $I_{363}$ are connected to charge a capacitor 375. A transistor 372 is connected to discharge the capacitor 375. The signal $V_A$ is coupled to control the transistor 372 through an inverter 371. The signal $V_A$ is further connected to an AND gate 379. Another input of the AND gate 379 is coupled to the capacitor 375. Once the gate-drive signal $V_A$ is enabled, the output of the AND gate 379 will generate the minimum-on-time signal $S_N$. The minimum on time of the drive signal $S_A$ is determined by the current of the current source 373, the capacitance of the capacitor 375 and the resistance of the resistor 86.

Figure 9:
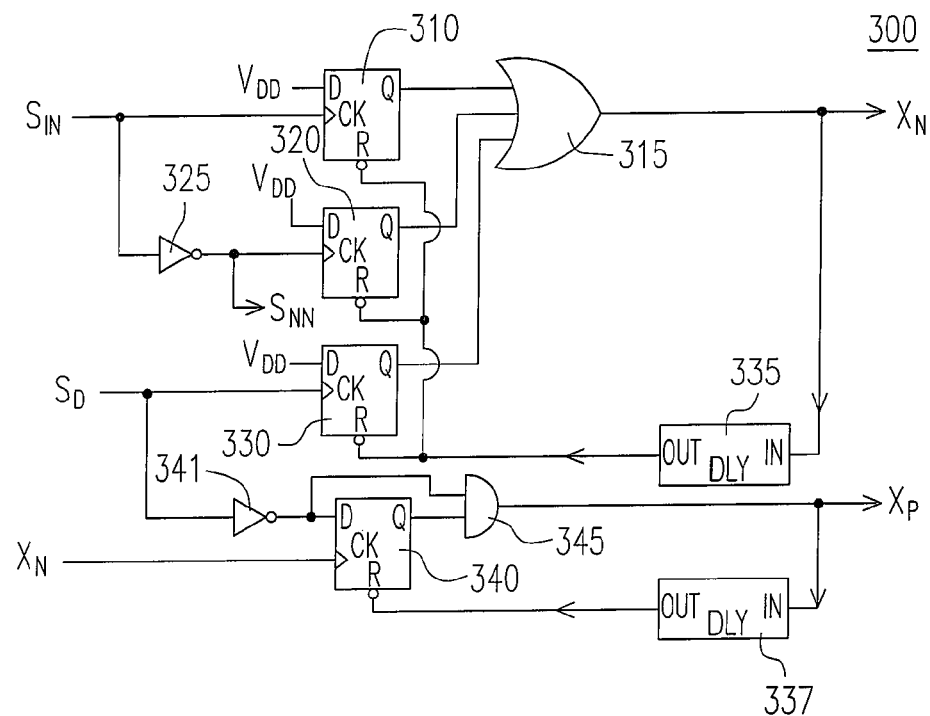
FIG. 9 is an embodiment of a signal generation circuit according to the present invention.

FIG. 9 is a schematic diagram of an embodiment of the signal generation circuit 300 according to the present invention. The clock-input of a flip-flop 310 is coupled to receive the switching signal $S_{IN}$ and generates a first signal connected to a first input of an OR gate 315. The switching signal $S_{IN}$ further generates a signal $S_{NN}$ through an inverter 325. The signal $S_{NN}$ is connected to drive the clock-input of a flip-flop 320. The flip-flop 320 outputs a second signal connected to a second input of the OR gate 315. The clock-input of a flip-flop 330 is coupled to receive the discontinuous-mode signal $S_D$ and generates a third signal connected to a third input of an OR gate 315. The OR gate 315 is utilized to generate a negative-pulse signal at the second output-signal terminal $X_N$ for turning off integrated synchronous rectifier 51 and 52. The negative-pulse signal is coupled to reset flip-flops 310, 320 and 330 through a delay circuit (DLY) 335. The delay time of the delay circuit 335 determines the pulse width $T_P$ of the negative-pulse signal. The discontinuous-mode signal $S_D$ is coupled to the D-input terminal of a flip-flop 340 and the input of an AND gate 345 through an inverter 341. The clock-input of the flip-flop 340 is coupled to the second output-signal terminal $X_N$ to receive the negative-pulse signal. The output of the flip-flop 340 is connected to another input of the AND gate 345. The AND gate 345 is utilized to generate a positive-pulse signal at the first output-signal terminal $X_P$. The positive-pulse signal is coupled to reset the flip-flop 340 via a delay circuit 337. The delay time of the delay circuit 337 determines the pulse width $T_P$ of the positive-pulse signal. The pulse signal is therefore developed by the positive-pulse signal and the negative-pulse signal on the first output-signal terminal $X_P$ and the second output-signal terminal $X_N$.

Figure 10:
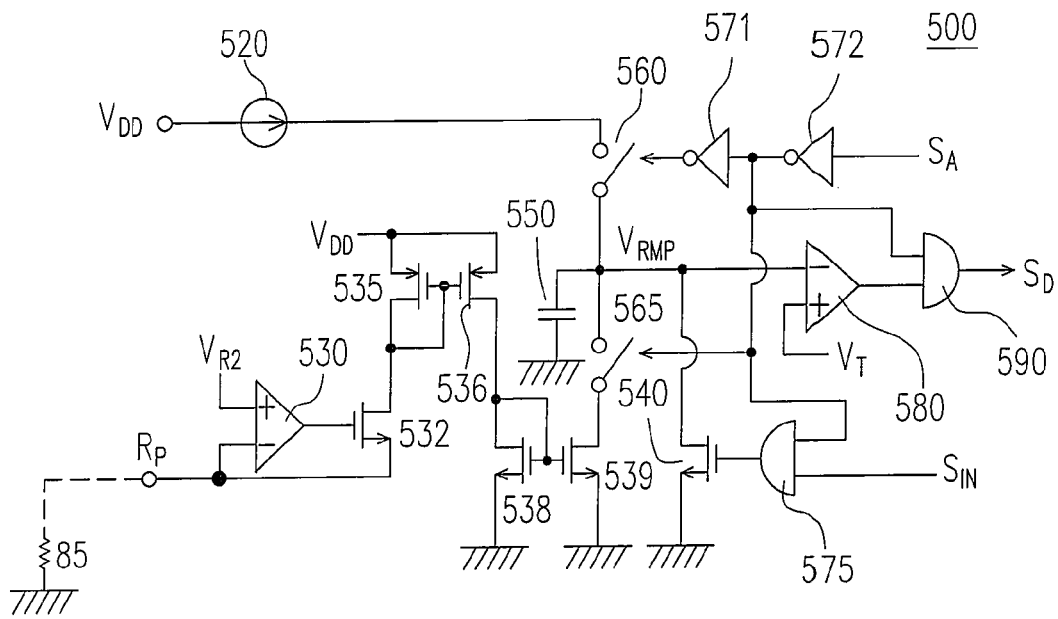
FIG. 10 is an embodiment of a linear-predict circuit according to the present invention.

FIG. 10 is a schematic diagram of an embodiment of the linear-predict circuit 500 as shown in FIG. 6. An operational amplifier 530, the resistor 85 and transistors 532, 535, 536, 538 and 539 develop a voltage-to-current converter. The operational amplifier 530 is coupled to the programming terminal RP to produce the program signal for generating a discharge-current at the transistor 539. A charge-current 520 is coupled to charge a capacitor 550 via a switch 560. The discharge-current is coupled to discharge the capacitor 550 through a switch 565. An inverter 572 is coupled to receive the drive signal $S_A$ for producing a discharge signal. The discharge signal is connected to control the switch 565. The discharge signal is further connected to an inverter 571 to generate a charge signal for controlling the switch 560. A ramp signal $V_{RMP}$ is generated at the capacitor 550. The positive input of a comparator 580 has a threshold $V_T$. The negative input of the comparator 580 is coupled to the ramp signal $V_{RMP}$. The output of the comparator 580 and the discharge signal are connected to an AND 590 to generate the discontinuous-mode signal $S_D$. Furthermore, the discharge signal and the switching signal $S_{IN}$ are coupled to reset the capacitor 550 through a transistor 540 and an AND gate 575. The discontinuous-mode signal $S_D$ is therefore generated in response to the program signal and the pulse width of the switching signal $S_{IN}$.

When the power converter operated in the boundary mode, the magnetized flux $\Phi_C$ of the inductance device is equal to the demagnetized flux $\Phi_D$. The boundary mode means the power converter is operated between the continuous current mode and the discontinuous current mode.

The equality is shown as, $$\Phi_C = \Phi_D \tag{5}$$

$$\Phi = B \times Ae = \frac{V \times T}{N} \tag{6}$$

$$\left[\left(\frac{V_{IN} \times N_S}{N_P}\right) - V_O\right] \times T_{CHARGE} = V_O \times T_{DISCHARGE} \tag{7}$$

$$T_{DISCHARGE} = \left\{\left[\left(\frac{V_{IN} \times N_S}{N_P}\right) - V_O\right] / V_O\right\} \times T_{CHARGE} \tag{8}$$

$$T_{DISCHARGE} = K \times T_{CHARGE} \tag{9}$$

where B is the flux density; Ae is the cross-section area of the inductance device; the magnetized time ($T_{CHARGE}$) is the pulse width of the switching signal $S_{IN}$; $N_P$ and $N_S$ are the turn ratio of the transformer 10; and the demagnetized time ($T_{DISCHARGE}$) of the inductance device shows the boundary condition of the power converter.

The demagnetized time $T_{DISCHARGE}$ of the inductance device can be obtained in accordance with equation (8). It also shows the demagnetized time $T_{DISCHARGE}$ can be predicted in accordance with the input voltage $V_{IN}$, the output voltage $V_O$ and the magnetized time $T_{CHARGE}$ (the pulse width of the switching signal $S_{IN}$). If the input voltage $V_{IN}$ and the output voltage $V_O$ can be considered as constants, then the demagnetized time $T_{DISCHARGE}$ could be determined only by the pulse width of the switching signal $S_{IN}$. The K value is programmed by the program signal through the programming terminal RP as shown in equation (9). The discontinuous-mode signal $S_D$ is generated in response to the demagnetized time $T_{DISCHARGE}$.

Figure 11:
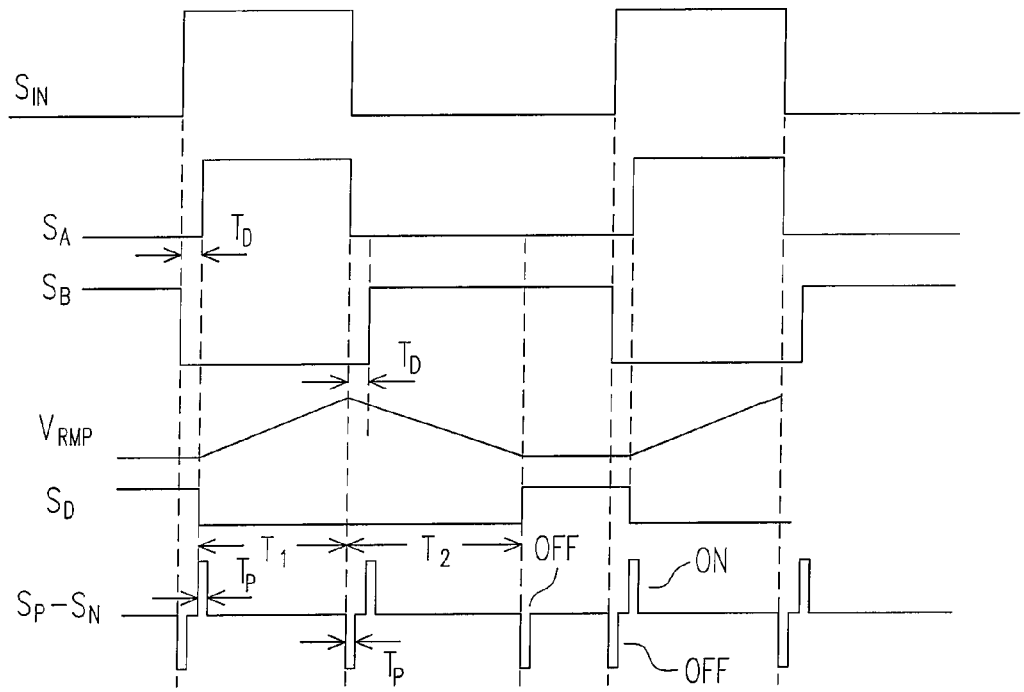
FIG. 11 shows signal waveforms of the synchronous rectifying circuit in response to the switching signal according to an embodiment of the present invention.

FIG. 11 shows signal waveforms of the synchronous rectifying circuit. The drive signals $S_A$ and $S_B$ are respectively generated in response to the rising edge and the falling edge of the switching signal $S_{IN}$. The delay time $T_D$ is designed in between the rising edge of the switching signal $S_{IN}$ and the rising edge of the drive signal $S_A$. Besides, another delay time $T_D$ is designed between the falling edge of the switching signal $S_{IN}$ and the rising edge of the drive signal $S_B$. The drive signal $S_B$ is the inverse of the drive signal $S_A$. A pulse signal $S_P$-$S_N$ (negative pulse signal) is generated in response to the leading edge and the trailing edge of the switching signal $S_{IN}$ to disable the integrated synchronous rectifier 51 and 52. Following the end of the negative pulse signal, a pulse signal $S_P$-$S_N$ (positive pulse signal) is generated to enable integrated synchronous rectifier 51 or 52 if the diode of the integrated synchronous rectifier 51 or 52 is conducted. Furthermore, the discontinuous-mode signal $S_D$ and the additional pulse signal $S_P$-$S_N$ (negative pulse signal) are generated at the end of the discharge time of the ramp signal $V_{RMP}$. It means the integrated synchronous rectifier 51 and 52 will be disabled when the power converter is operated in the discontinuous current mode and/or the burst period of the burst mode.

Figure 12:
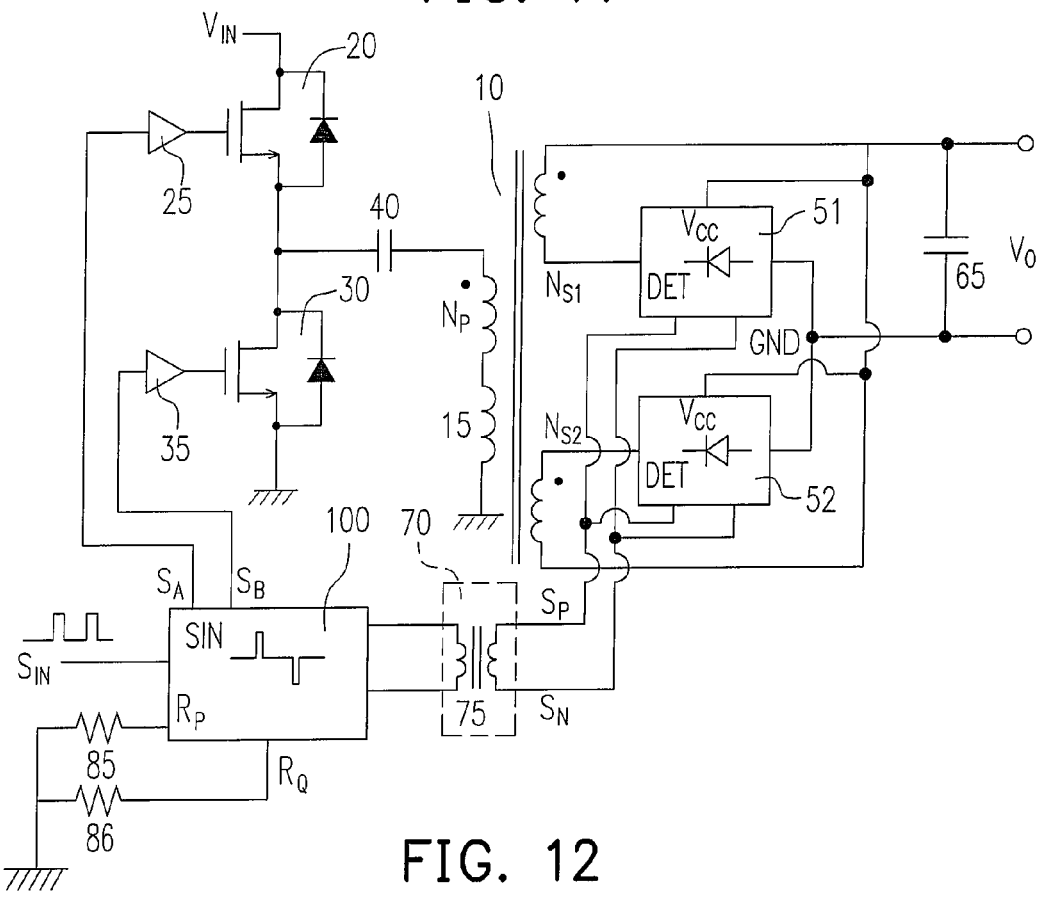
FIG. 12 shows another embodiment of a soft switching power converter with synchronous rectifier, in which a pulse transformer operated as the isolation device according to the present invention.

FIG. 12 shows a soft switching power converter with integrated synchronous rectifier of another embodiment of the invention. A pulse transformer 75 is used as the isolation device 70 for synchronous rectifying circuit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A control circuit for soft switching and synchronous rectifying of a power converter, comprising:
   an integrated synchronous rectifier comprising:
   a cathode terminal, coupled to a secondary side of a power transformer;
   an anode terminal, coupled to an output of the power converter;
   a first input-signal terminal; and
   a second input-signal terminal,
   wherein the integrated synchronous rectifier includes a controller and a power transistor connected between the cathode terminal and the anode terminal; and the first input-signal terminal and the second input-signal terminal are coupled to the controller to receive a pulse signal for switching on/off the power transistor;
   a switching-signal circuit comprising:
   an input terminal coupled to receive a switching signal;
   a first output-signal terminal; and
   a second output-signal terminal,
   wherein the switching signal is used for regulating the power converter by switching the power transformer; the first output-signal terminal and the second output-signal terminal are coupled to a pulse generation circuit to generate the pulse signal in response to a leading edge and a trailing edge of the switching signal; and
   an isolation device, coupled between the first input-signal terminal and the second input-signal terminal of the integrated synchronous rectifier, and the first output-signal terminal and the second output-signal terminal of the switching-signal circuit.

2. The control circuit as claimed in claim 1, wherein the switching-signal circuit further comprises:
   a programming terminal, for generating a program signal;
   wherein the program signal is coupled to a linear-predict circuit, and wherein the program signal associates with the switching signal generating the pulse signal to switch off the power transistor.

3. The control circuit as claimed in claim 1, wherein the switching-signal circuit generates drive signals in response to the switching signal; drive signals are coupled to switch the transformer; and a propagation delay is developed between drive signals for achieving soft switching of the power converter.

4. The control circuit as claimed in claim 1, wherein the isolation device comprises a pulse transformer or capacitors.

5. The control circuit as claimed in claim 1, wherein the pulse signal comprises a differential signal; and a polarity of the pulse signal determines the on/off state of integrated synchronous rectifier; the pulse signal is a trig signal, and wherein the pulse width of the pulse signal is shorter than the pulse width of the switching signal.

6. The control circuit as claimed in claim 1, wherein the integrated synchronous rectifier comprises a latch circuit coupled to the first input-signal terminal and the second input-signal terminal of the integrated synchronous rectifier; the pulse signal is coupled to set or reset the latch circuit for turning on/off the power transistor.

7. The control circuit as claimed in claim 1, wherein the integrated synchronous rectifier further comprises a maximum-on-time circuit to limit the maximum on time of the power transistor.

8. The control circuit as claimed in claim 1, wherein the switching-signal circuit further comprises a minimum-on-time circuit to ensure a minimum on time of drive signals.

9. The control circuit as claimed in claim 1, wherein the switching-signal circuit further comprises a second programming terminal coupled to the minimum-on-time circuit for programming the minimum on time of drive signals.

10. A control apparatus for soft switching and synchronous rectifying of a power converter, comprising:
a switching-signal circuit, for generating drive signals and a pulse signal in response to a leading edge and a trailing edge of a switching signal;
an isolation device, coupled to transfer the pulse signal from a primary side of a power transformer to a secondary side of the power transformer; and
a synchronous rectifying circuit, having a power transistor and a controller; wherein the power transistor is coupled to the secondary side of the power transformer for the rectifying operation; and the controller is operated to receive the pulse signal for switching on/off the power transistor;
wherein the switching signal is coupled to switch the power transformer through drive signals; and the pulse signal is coupled to set or reset a latch circuit of the controller for controlling the power transistor.

11. The control apparatus as claimed in claim 10, wherein a propagation delay is developed between drive signals for achieving soft switching of the power converter.

12. The control apparatus as claimed in claim 10, wherein the switching-signal circuit comprises a linear-predict circuit for generating the pulse signal to turn off the power transistor in response to the switching signal.

13. The control apparatus as claimed in claim 10, further comprising a diode coupled in parallel to the power transistor; and wherein the power transistor can be turned on by the pulse signal once the diode is conducted.

14. The control apparatus as claimed in claim 10, wherein the isolation device comprises capacitors or a pulse transformer.

15. The control apparatus as claimed in claim 10, wherein the pulse signal is a trig signal; and the pulse width of the pulse signal is shorter than the pulse width of the switching signal.

16. The control apparatus as claimed in claim 10, wherein the switching-signal circuit comprises a minimum-on-time circuit to ensure the minimum on time of drive signal.

17. The control apparatus as claimed in claim 10, wherein the synchronous rectifying circuit comprises:
a cathode terminal, coupled to the secondary side of the power transformer;
an anode terminal, coupled to the output of the power converter;
a first input-signal terminal; and
a second input-signal terminal;
wherein the power transistor is connected between the cathode terminal and the anode terminal; and the first input-signal terminal and the second input-signal terminal are coupled to receive the pulse signal for turning on/off the power transistor.

18. The control apparatus as claimed in claim 10, wherein the synchronous rectifying circuit comprises a maximum-on-time circuit to limit the maximum on time of the power transistor.

19. The control apparatus as claimed in claim 10, wherein the switching-signal circuit comprises:
an input terminal, for receiving the switching signal;
a first output-signal terminal; and
a second output-signal terminal;
wherein the pulse signal is coupled to the isolation device through the first output-signal terminal and the second output-signal terminal.

20. The control apparatus as claimed in claim 19, wherein the switching-signal circuit further comprises:
a programming terminal, for generating a program signal;
wherein the program signal is coupled to a linear-predict circuit, and wherein the program signal associates with the switching signal generating the pulse signal to switch off the power transistor.

21. The control apparatus as claimed in claim 19, wherein the switching-signal circuit further comprises a second programming terminal coupled to the minimum-on-time circuit for programming a minimum on time of drive signals.

22. A method for controlling synchronous rectifying of a power converter, comprising:
generating a pulse signal in response to a leading edge and a trailing edge of a switching signal;
transferring the pulse signal from a primary side of a power transformer to a secondary side of the power transformer through an isolation barrier;
setting or resetting a latch in response to the pulse signal; and
turning on/off a power transistor in accordance with a status of the latch;
wherein the switching signal is used for regulating the power converter through switching the power transformer; and the power transistor is equipped in the secondary side of the power transformer for the rectifying operation.

23. The method as claimed in claim 22, wherein a pulse width of the pulse signal is shorter than a pulse width of the switching signal.

24. The method as claimed in claim 22, wherein a maximum on time of the power transistor is limited by a maximum-on-time circuit.

25. The method as claimed in claim 22, further comprising a step of turning off the power transistor in response to the pulse width of the switching signal, wherein the pulse signal is generated to switch off the power transistor.

26. The method as claimed in claim 25, wherein the pulse signal is generated by a linear-predict circuit to switch off the power transistor.

27. The method as claimed in claim 26, wherein the linear-predict circuit comprises a programming terminal for generating a program signal; and the program signal associates with the pulse width of the switching signal to generate the pulse signal.

28. A method for controlling soft switching of a power converter, comprising:
generating drive signals in response to a leading edge and a trailing edge of a switching signal;
generating a propagation delay between drive signals; and producing a minimum on time of drive signal by a minimum-on-time circuit for achieving the soft switching of the power converter, wherein the minimum-on-time circuit comprising a programming terminal for programming the minimum on time of drive signals; wherein the switching signal is used for regulating the power converter; and drive signals are coupled to switch a power transformer.

* * * * *